(12) United States Patent
Mardmoeller et al.

(10) Patent No.: US 12,212,639 B2
(45) Date of Patent: Jan. 28, 2025

(54) MESSAGE HANDLER

(71) Applicant: RENESAS ELECTRONICS CORPORATION, Tokyo (JP)

(72) Inventors: Christian Mardmoeller, Duesseldorf (DE); Dnyaneshwar Kulkarni, Duesseldorf (DE); Thorsten Hoffleit, Duesseldorf (DE)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 18/384,574

(22) Filed: Oct. 27, 2023

(65) Prior Publication Data

US 2024/0073299 A1 Feb. 29, 2024

Related U.S. Application Data

(63) Continuation of application No. 17/242,609, filed on Apr. 28, 2021, now Pat. No. 11,876,879, which is a
(Continued)

(51) Int. Cl.
*H04L 69/08* (2022.01)
*H04L 12/66* (2006.01)
(Continued)

(52) U.S. Cl.
CPC .............. *H04L 69/08* (2013.01); *H04L 12/66* (2013.01); *H04L 45/741* (2013.01); *H04L 69/18* (2013.01); *H04L 45/306* (2013.01); *H04L 69/325* (2013.01)

(58) Field of Classification Search
CPC ....... H04L 69/08; H04L 69/18; H04L 69/325; H04L 12/66; H04L 45/741; H04L 45/306
See application file for complete search history.

(56) References Cited

U.S. PATENT DOCUMENTS 6,324,178 B1   11/2001   Lo et al.
2006/0168267 A1   7/2006   Fernandes et al.
(Continued)

FOREIGN PATENT DOCUMENTS

CN   101232495 A   7/2008
CN   102255958 A   11/2011
(Continued)

OTHER PUBLICATIONS

Jin Ho Kim et al., 'Gateway Framework for In-Vehicle Networks Based on CAN, FlexRay, and Ethernet', IEEE Transactions on Vehicular Technology, vol. 64, No. 10, Oct. 2015, pp. 4472-4486. (Year: 2015).*

(Continued)

*Primary Examiner* — Melvin C Marcelo
(74) *Attorney, Agent, or Firm* — BURR & FORMAN LLP

(57) ABSTRACT

A message handler is described. The message handler is configured, in response to receiving a data package which is formatted according to a given communications protocol, such as CAN or Ethernet, and which comprises package-directing data and payload data, to generate package having a predetermined data format, for example a layer-2 or layer-3 package, which comprises a header and payload data. The header comprises an address generated in dependence upon the package-directing data and wherein the payload comprises the data package. The package having a predetermined data format may be an IEEE 1722 frame.

17 Claims, 9 Drawing Sheets

Related U.S. Application Data continuation of application No. 15/999,728, filed as application No. PCT/EP2016/053459 on Feb. 18, 2016, now Pat. No. 11,019,182.

(51) Int. Cl.
*H04L 45/741* (2022.01)
*H04L 69/18* (2022.01)
*H04L 45/302* (2022.01)
*H04L 69/325* (2022.01)

(56) References Cited

U.S. PATENT DOCUMENTS

| | | |
|---|---|---|
| 2007/0014278 A1 | 1/2007 | Ebbesen et al. |
| 2007/0014303 A1 | 1/2007 | Schulz |
| 2010/0027416 A1 | 2/2010 | Beauford |
| 2011/0149982 A1 | 6/2011 | Hwang et al. |
| 2012/0099589 A1 | 4/2012 | Kato |
| 2012/0291127 A1 | 11/2012 | Rangarajan et al. |
| 2014/0133350 A1 | 5/2014 | Triess et al. |

FOREIGN PATENT DOCUMENTS

| | | |
|---|---|---|
| CN | 102318283 A | 1/2012 |
| CN | 104516765 A | 4/2015 |
| CN | 104811374 A | 7/2015 |
| CN | 105103460 A | 11/2015 |
| DE | 102012215765 A1 | 5/2014 |
| EP | 2833585 A1 | 2/2015 |
| EP | 2938046 A1 | 10/2015 |
| JP | 2009027245 A | 2/2009 |
| WO | 02059757 A1 | 8/2002 |
| WO | 02062089 A1 | 8/2002 |
| WO | 2011135457 A2 | 11/2011 |
| WO | 2015080658 A1 | 6/2015 |

OTHER PUBLICATIONS

S. Zhiqiang: "Simplify CAN and LIN In-vehicle Network Testing", World Electronic Components (2006).

Jin Ho Kim et al. 'Gateway Framework for In-Vehicle Networks Based on CAN, Flexray, and Ethernet', IEEE Transaction on Vehicular Technology, vol. 64, No. 10, Oct. 2015, pp. 4472-4486. (Year: 2015).

Zhang Wen-ya et al.: "Design for lwIP-based embedded gateway for CAN/Ethernet" (2007).

\* cited by examiner

| Address | Bit | Comment |
|---|---|---|
| +0 | 802.1 header | Under SW control based on AFL |
| - | Optional 802.1Q header | Under SW control based on AFL |
| +14 | subtype[28:11] | Under SW control based on AFL |
| | sv | Under SW control based on AFL |
| | version[2:0] | Under SW control based on AFL |
| | r | 0 |
| | ntscf_data_length[10:0] | Calculated based on DLC |
| | sequence_num[7:0] | Cyclically updated |
| +18 | stream_id[63:0] | Under SW control based on AFL |
| +22 | acf_msg_type[6:0] | Under SW control based on AFL |
| | acf_msg_length[8:0] | Calculated based on DLC |
| | pad[1:0] | Calculated based on DLC |
| | mtv | Under SW control based on AFL |
| | rtr | RTR |
| | eff | IDE |
| | hdr | 0 (CAN-FD only) |
| | edl | 0 (CAN-FD only) |
| | esi | 0 (CAN-FD only) |
| | rsv[2:0] | Under SW control based on AFL |
| | can_bus_id | Under SW control based on AFL |
| | rsv[2:0] | Under SW control based on AFL |
| +26 | message_timestamp[63:0] | Receive time for SW |
| +34 | can_identifier[28:0] | ID (standard or extended) |
| +38 | DATA[31:0] | |
| +42 | DATA[63:32] | |

 = Copied from media-dependent package

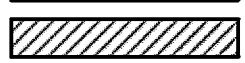 Selected based on received CAN message

 = Calculated

Fig. 7

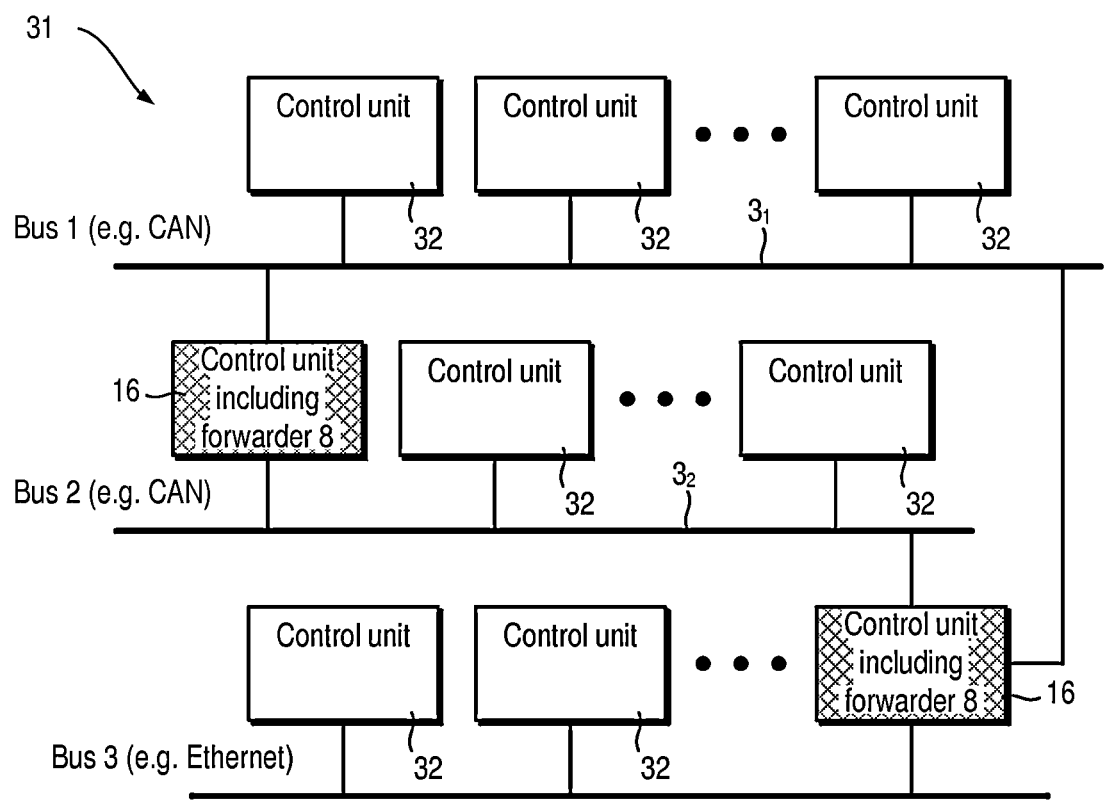
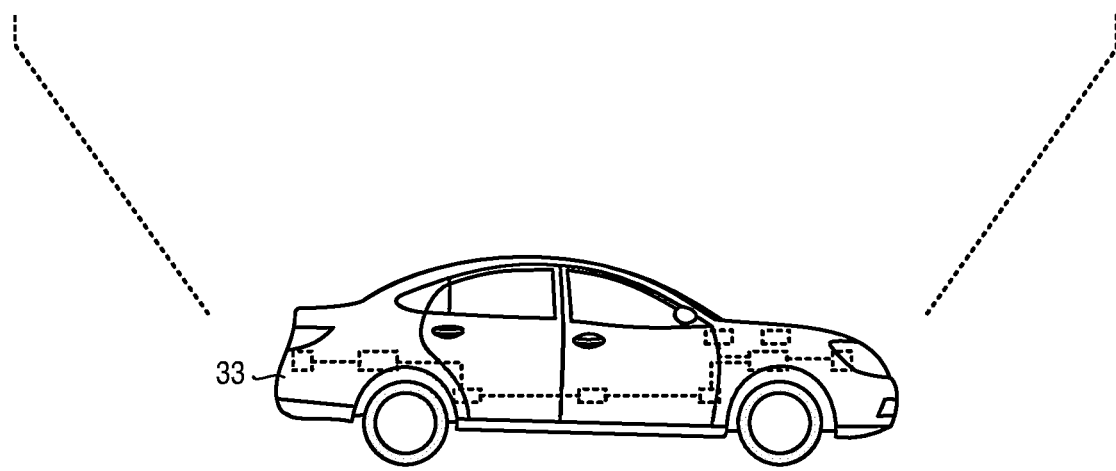
Fig. 8

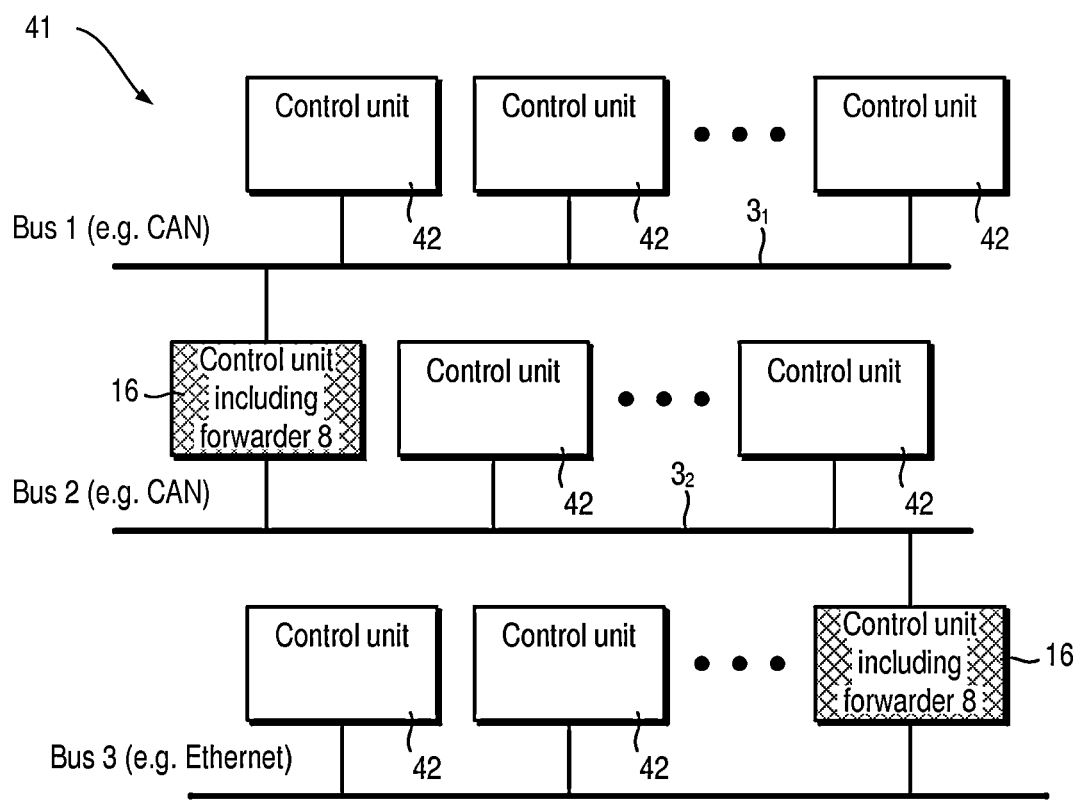
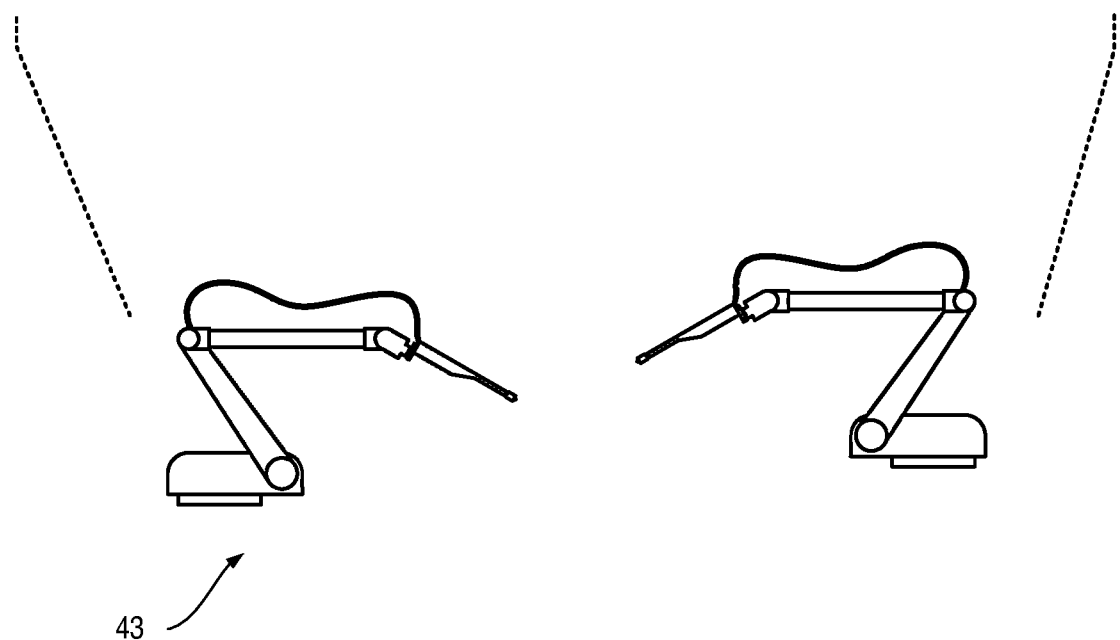
Fig. 9

MESSAGE HANDLER

CROSS-REFERENCE TO RELATED APPLICATIONS

This application is a continuation of U.S. patent application Ser. No. 17/242,609 filed Apr. 28, 2021, which is a continuation of U.S. patent application Ser. No. 15/999,728 filed Aug. 20, 2018, which is a U.S. national stage entry of International Application No. PCT/EP2016/053459 filed Feb. 18, 2016, and claims the benefit of the its earlier filing date under 35 U.S.C. 119 (e); each of U.S. patent application Ser. No. 17/242,609, U.S. patent application Ser. No. 15/999,728 and International Application No. PCT/EP2016/053459 are incorporated herein by reference in their entirety.

FIELD OF THE INVENTION

The present invention relates to a message handler and to a control unit comprising at least two message handlers and message forwarder configured to switch or route data packages between message handlers.

BACKGROUND

A gateway allows information exchange between different network interfaces. The so network interfaces can use the same or different OSI physical layer ("layer 1"), data link ("layer 2") and/or network layer ("layer 3") protocol(s), such as Ethernet, controller area network (CAN), FlexRay and media orientated systems transport (MOST). Examples of gateways include Ethernet switches, Digital Subscriber Line Access Multiplexers (DSLAMs) and fieldbus gateways.

Layer 2 gateways within the same protocol, such as Ethernet 10/100/1000 switches and CAN/CAN gateways, tend to be simple because frames in the data link layer are identical, although data rates can change. Layer 2 gateways across protocols, such as CAN/CAN-FD gateways, can provide re-framing without changing a packet (or "package") on the network layer. Layer 3 gateways, such as IPv4/IPv6 gateways or CAN/Ethernet gateways, can re-structure a packet for the different addressing and traffic control requirements. Layer 4 to 7 gateways, such as TCP/UDP gateways and AUTOSAR signal gateways, allow changes between different transport protocols and re-assembling of information.

Layer 2 gateways within the same protocol or protocol family tend to be implemented in hardware and examples of such gateways include the CAN/CAN gateway in Renesas RH850/C1M microcontroller and the CAN/CAN-FD gateway in Renesas RH850/D1M microcontroller.

Referring to FIG. 1, layer 3 gateways are often implemented in software. A microcontroller has a set of network interfaces and software executed by a central processing unit of the microcontroller that can re-assemble a packet based on a configuration matrix. Examples of such gateways include a USB/UART converter and an automotive CAN/LIN/FlexRay gateway. Because communication protocols have different addressing schemes and have different message structures, software provides flexibility to convert between different protocols.

Layer 4 to 7 gateways are generally implemented in software. Re-assembling data in higher layers tends to require significant configurability and flexibility and this can only be practically achieved using a software-based implementation, although hardware-based solutions are possible, for example, in time-critical, conversion-specific cases, such as video data.

Framing of network layer packages is usually carried out in hardware and is transparent for the routing mechanism. Examples in which packet framing occurs include an Ethernet MAC, a FlexRay communication controller and a CAN protocol engine. All protocols tend to have an individual, optimised interface to exchange information with a higher layer.

Layer 3 gateways within same protocol family also tend to be easy to implement in hardware. Only minimal changes in packet structure are required in situations involving, for example, CAN/CAN-FD conversion and IPv4/IPv6 conversion.

Layer 3 gateways involving different protocols tend to be difficult to implement in hardware because of a need to reformat a packet so as to accommodate different addressing, routing and traffic control schemes. Packet conversion generally requires a flexible, configurable data manipulation unit. This can result in a gap in information because not all frame information may be convertible, such as in the case of Ethernet length to CAN DLC.

Addressing scheme conversion needs configurable translation tables between both network layers. Traffic control scheme conversion typically needs either a new layer 4 transport protocol or other high-level support.

Increasingly, communication systems comprise more than one type of bus system which are interconnected. This makes forwarding of data more complex.

US 2014/0133350 A1 describes a gateway module for connecting at least two sub-networks including first and second sub-networks supporting data transmission in accordance with a first and second communications protocols respectively. The gateway module has a configurable hardware circuit which is adapted to manipulate and forward data from the first sub-network and to the second sub-network taking into consideration the first and second communications protocols. However, as the number and type of communication protocols increases, this type of gateway becomes increasingly complex or requires hardware modification. Thus, as new communication interfaces are introduced, not only must a new interface module be added, but also the gateway module may need modification.

SUMMARY

According to a first aspect of the present invention there is provided a message handler. The message handler is configured, in response to receiving a data package which is formatted according to a given communications protocol and which comprises package-directing data and payload data, to generate a package having a predetermined data format, for example a layer-2 or layer-3 package, which comprises a header and payload data. The header comprises an address generated in dependence upon the package-directing data and the payload comprises the package.

Thus, different message handlers for different communications protocols can be provided in a control unit and be used to generate packages having a common data format. This can help to facilitate exchange of data between two or more communications buses and a host processor, and to enable a hardware-based switch or router to be used for exchanging data between the buses. Thus, the same routing mechanism can be used regardless of the specific communication protocols being used, whether they are the same or different protocols.

The incoming data package may exclude cyclic redundancy check data. The incoming data package may include a timestamp.

The package-directing data may comprise a message identity or a message content identifier (which can be used to identify multicast destinations), or a destination node address. The address may be a stream identifier.

The message handler may be configured to copy data from a first field in the package-directing data into a corresponding field in the header. The message handler may be configured to add predetermined data to a second field in the header. The predetermined data may be supplied by a host processor. The message handler may be configured to add calculated data to the header in dependence upon data from the first field and/or from a second field to a second field in the header.

The message handler may be configured, in response to receiving a package having a predetermined data format which comprises a header and payload data, to extract a data package which is formatted according to a given communications protocol and which comprises package-directing data and payload data.

According to a second aspect of the present invention there is provided a message handler configured, in response to receiving a package having a predetermined data format which comprises a header and payload data, to extract a data package which is formatted according to a given communications protocol and which comprises package-directing data and payload data.

The package having the predetermined data format may be an IEEE 1722 frame. The predetermined data format may comply with IEEE 1722. The package having the so predetermined data format may be an AVTP control message. The address may be a stream ID. The package having the predetermined data format may be a layer 2 frame.

The package having the predetermined data format may be an IP packet, for example, an IPv4 or IPv6 packet.

The given communications protocol may be ISO 11898-1 (or "CAN 2.0"). The given communications protocol may be controller area network flexible data rate protocol (CAN-FD) protocol. The given communications protocol may be FlexRay protocol.

The given communications protocol may be IEEE 802.3 (i.e. Ethernet). The given communications protocol may be media oriented systems transport (MOST) protocol. The given communications protocol may be Ethernet based. The given communications protocol may be EtherCAT, CC-Link IE Field, PROFINET, EtherNet/IP, Modbus TCP or FL-net.

According to a third aspect of the present invention there is provided a network interface module which is hardware-implemented and which comprises a protocol engine and a message handler and which is configured to exchange data packages formatted according to a given communications protocol with the protocol engine.

According to a fourth aspect of the present invention there is provided a central processing unit sub-system comprising a central processing unit, memory and a computer program stored in memory or other storage which, when executed by the central processing unit, causes the central processing unit to execute a message handler.

According to a fifth aspect of the present invention there is provided a message forwarder configured to exchange packages having a predetermined data format with first and second message handlers for handling messages according to first and second respective communications protocols. The message forwarder may be a layer-2 switch and/or layer-3 router.

According to a sixth aspect of the present invention there is provided a control unit comprising a first message handler or network interface module configured to handle data packages formatted according to a first communications protocol, a second message handler or network interface module configured to handle data packages formatted according to a second communications protocol and a message forwarder configured to exchange packages having the predetermined data format between the first and second message handlers. The message forwarder may be a layer-2 switch or layer 3-router.

The first and second communication protocols may be different. The first and second communication protocols may be the same.

The control unit may further comprise a third message configured to handle data packages formatted according to a third communications protocol (which may be the same or different to the first communications protocol and/or the second communications protocol).

The control unit may further comprise a central processing unit system wherein the message forwarder is configured to exchange between the central processing unit sub-system and the first and/or second message handlers.

The control unit may be an integrated circuit, such as a microcontroller or a system-on-a-chip.

According to a seventh aspect of the present invention there is provided a communications system comprising at least two sets of buses lines and at least one control unit according to the second aspect of the present invention which is (are) connected to the buses. The buses may include buses of different types (such as CAN, CAN-FD and Ethernet).

According to an eighth aspect of the present invention there is provided a vehicle comprising a communications system.

The vehicle may be a motor vehicle. The motor vehicle may be a motorcycle, an automobile (sometimes referred to as a "car"), a minibus, a bus, a truck or lorry. The motor vehicle may be powered by an internal combustion engine and/or one or more electric motors. The vehicle may be a train or a part of a train, such as a locomotive, railway car or multiple unit.

The vehicle may be an aircraft. The communication system may be an Avionics Full-Duplex Switched Ethernet (AFDX) system.

According to a ninth aspect of the present invention there is provided industrial system, such as plant or machinery, comprising a communications system. The plant or machinery may comprise an industrial system for use in manufacturing or processing.

According to a tenth aspect of the present invention there is provided a medical system comprising a communications system.

BRIEF DESCRIPTION OF THE DRAWINGS

Certain embodiments of the present invention will now be described, by way of example, with reference to FIGS. 2 to 8 of the accompanying drawings, in which:

FIG. 7 illustrates an AVTP common message;

FIG. 8 is a schematic diagram of a vehicular communications network and a vehicle; and FIG. 9 is a schematic diagram of an industrial communications network and robots.

DETAILED DESCRIPTION OF CERTAIN EMBODIMENTS

Communications System 1

Figure 1:
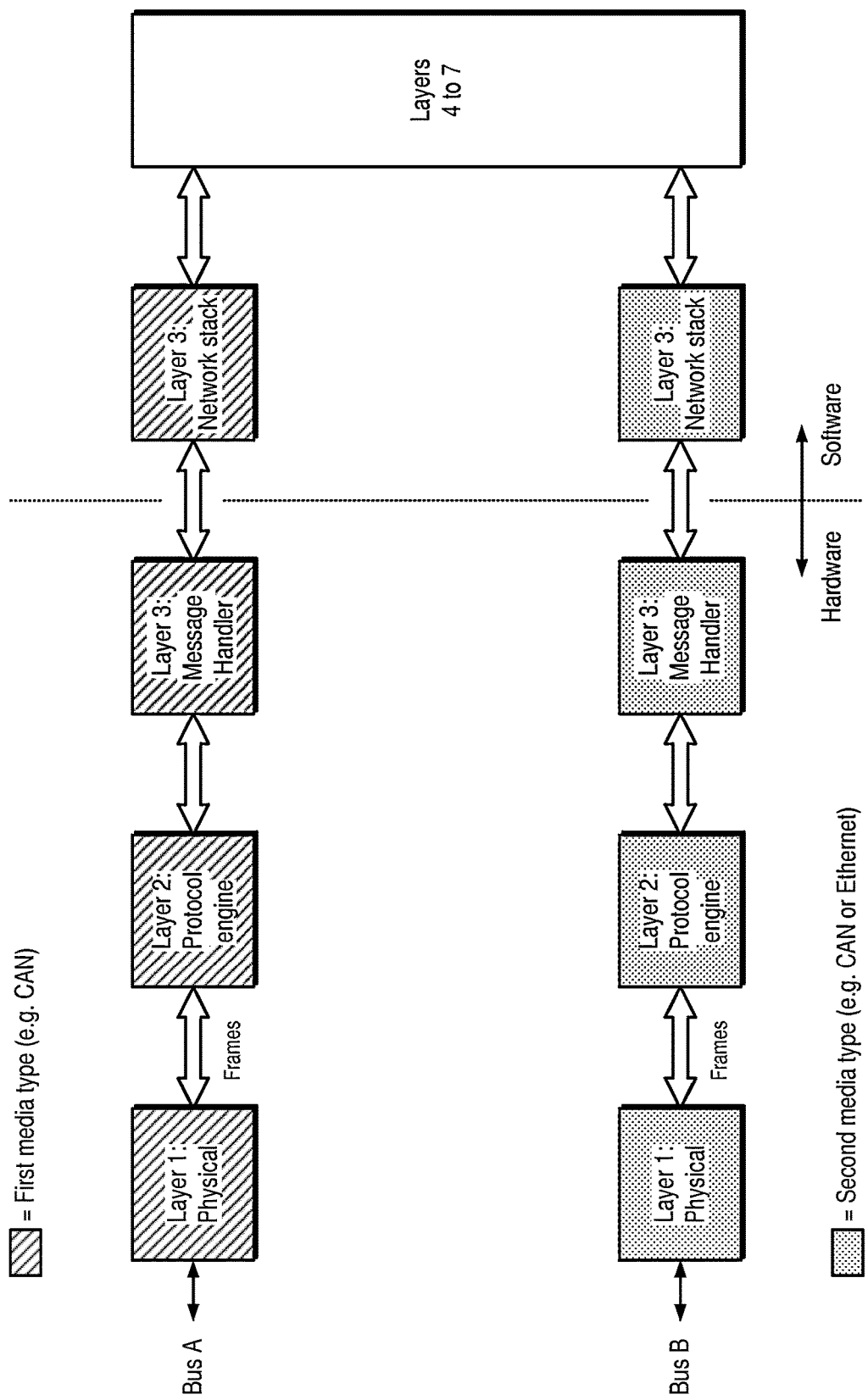
FIG. 1 is a schematic block diagram of a communications system in which data can be exchanged between buses in software.
Figure 2:
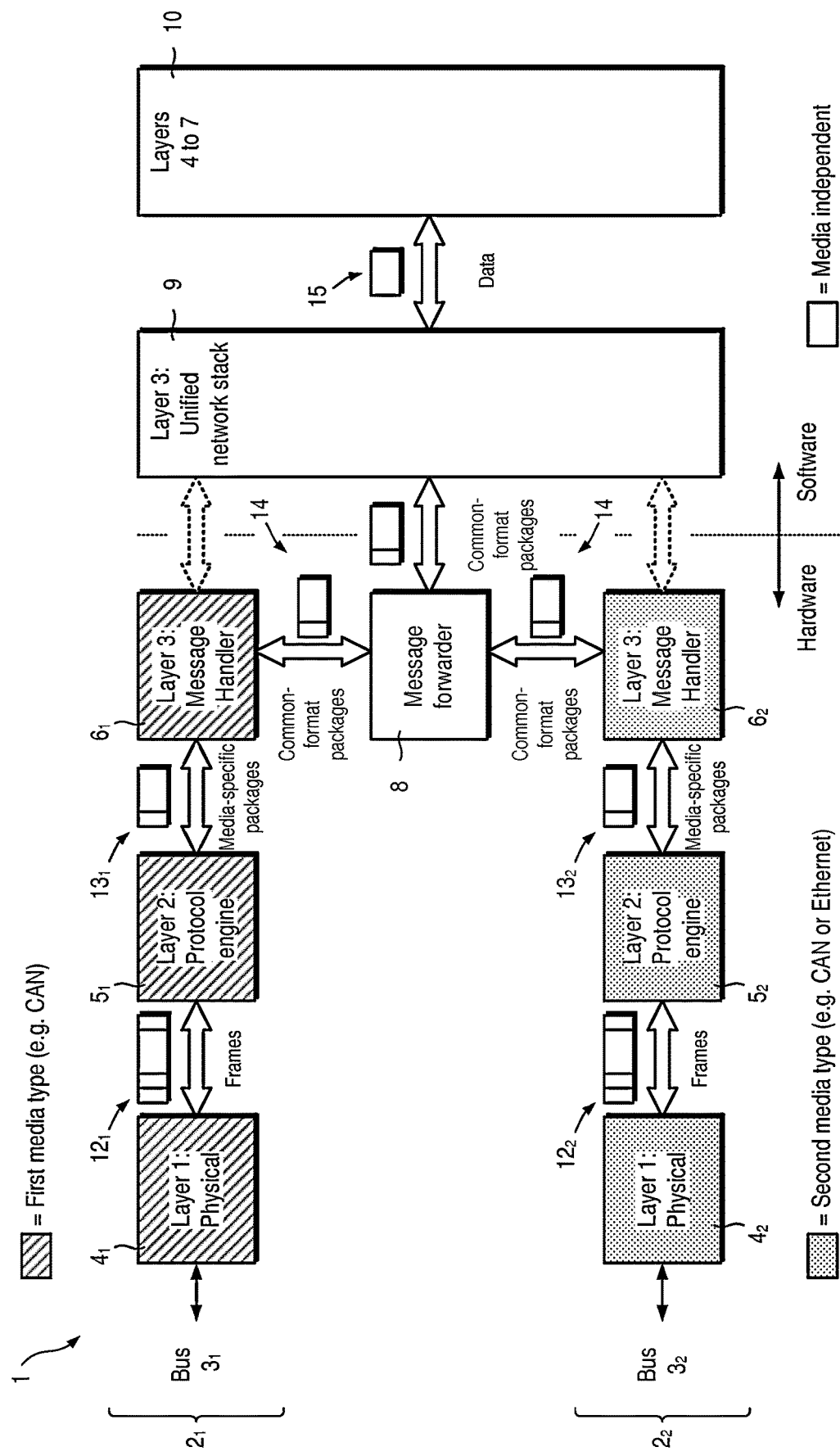
FIG. 2 is a schematic block diagram of a communications system in which data can be exchanged between buses in hardware.

FIG. 2 shows a communications system 1 which includes first and second sections $2_1$, $2_2$ for implementing the lowest protocol layers for first and second communications protocols, such as controller area network (CAN) and Ethernet, which are connected to first and second sets of bus lines $3_1$, $3_2$.

Figure 3:
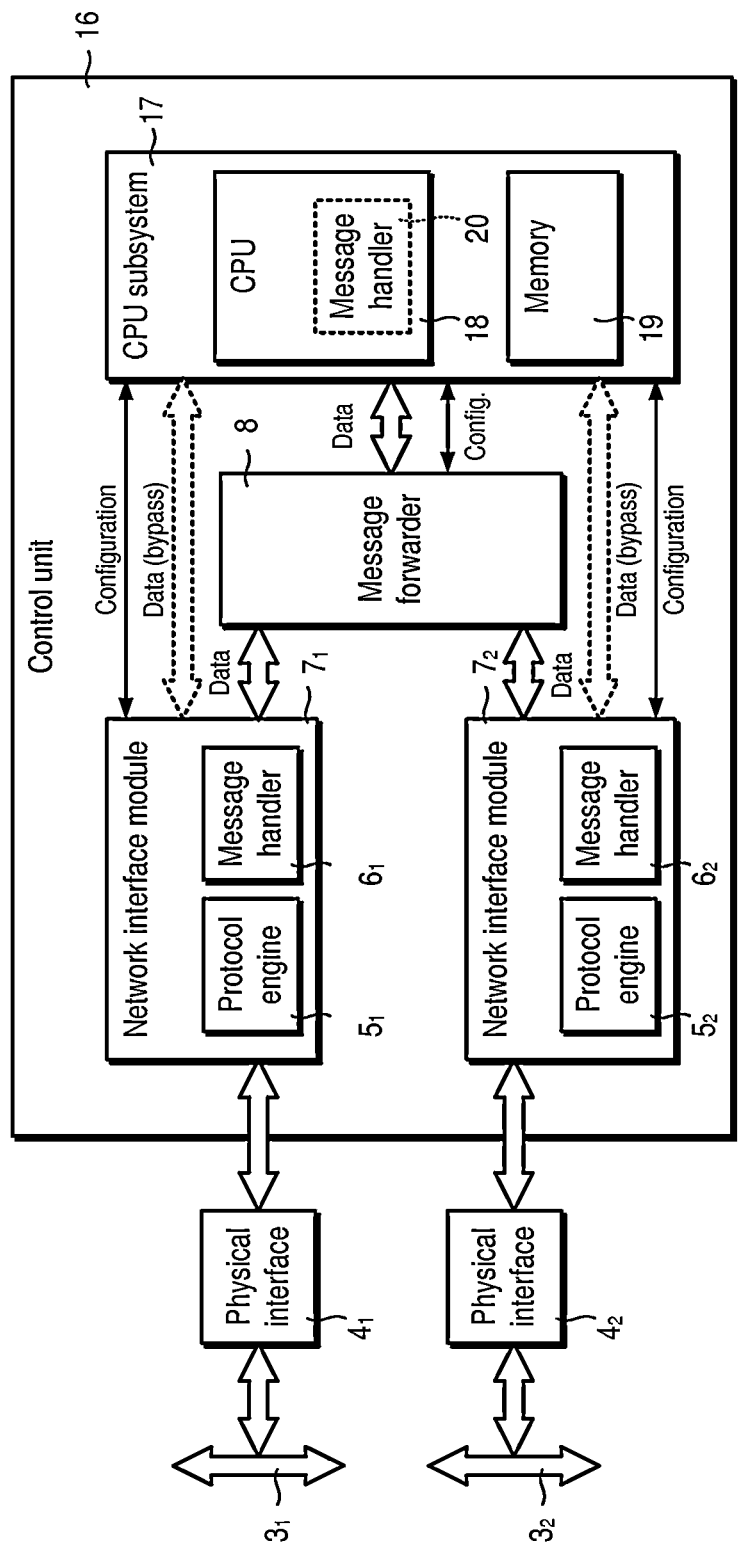
FIG. 3 is a schematic block diagram of a control unit.

The first section $2_1$ includes a physical layer module $4_1$, a protocol engine module $5_1$ and a message handler $6_1$. The protocol engine module $5_1$ and message handler $6_1$ are implemented in hardware in a network interface module $7_1$ (FIG. 3).

The second section $2_2$ includes a physical layer module $4_2$, a protocol engine module $5_2$ and a message handler $6_2$. The protocol engine module $5_2$ and message handler $6_2$ are implemented in hardware in a network interface module $7_2$ (FIG. 3).

The message handlers $6_1$, $6_2$ are interconnected by a package or message forwarder 8 which can take the form of a layer-2 switch or a layer-3 router. The message forwarder 8 is preferably implemented in hardware comprising appropriate hardware logic, hardware registers etc. The message forwarder 8 does not carry out any protocol conversion. The message forwarder 8 is also connected, via a unified network stack 9, to higher layers 10. The unified network stack 9 and higher layers 10 are implemented in software.

The physical layer module $4_1$, $4_2$ passes incoming frames $12_1$, $12_2$ to the protocol engine $5_1$, $5_2$ which can remove frame components, such as the frame check sequence (FCS), and generates packages $13_1$, $13_2$. The protocol engine $5_1$, $5_2$ may add information, such as a timestamp, to the packages $13_1$, $13_2$.

The protocol engine $5_1$, $5_2$ passes the packages $13_1$, $13_2$ to the message handler $6_1$, $6_2$ which generates common-format packages 14. As will be explained in more detail later, the message handler $6_1$, $6_2$ can pass the common-format packages 14 to the message forwarder 8 for switching or routing the common-format packages 14 to another message handler $6_1$, $6_2$ and/or to the unified network stack 9. Thus, packages can be forwarded not only between message handlers $6_1$, $6_2$, but also to higher layers 10.

If there are more than two message handlers $6_1$, $6_2$, then the message forwarder 8 can switch or route packages to more than one message handler $6_1$, $6_2$, as well as to the higher layers 10, if necessary. The message forwarder 8 may unicast or multicast messages.

Referring also to FIG. 3, the physical layer modules $4_1$, $4_2$ take the form of PHY transceivers $4_1$, $4_2$. The protocol layers $5_1$, $5_2$, message handlers $6_1$, $6_2$, message forwarder 8, unified stack 9 and higher layers 10 are implemented in a control unit 16 in the form of a microcontroller or system-on-a-chip. The control unit 16 comprises network interface modules $7_1$, $7_2$ (or "communication controllers") which provide the protocol engines $5_1$, $5_2$ and message handlers $6_1$, $6_2$. The control unit 16 comprises a central processing unit subsystem 17 which includes at least one central processing unit (CPU) 18, memory 19 and an on-chip interconnect (not shown). The physical layer modules $4_1$, $4_2$ can also be implemented in the microcontroller or system-on-a-chip.

The CPU 18 is able to configure the network interface modules $7_1$, $7_2$ and the message forwarder 8. The CPU 18 may also be able to access message handler $6_1$, $6_2$, bypassing the message forwarder 8, so as to be able to read, write and process frames more directly. Thus, the message forwarding mechanism need not be used for all frames. For example, message forwarding can be used to route frames automatically for certain, predetermined types of frames. Notwithstanding the fact that the message forwarder 8 can be bypassed, the CPU 18 may still use the common format, although it may also be able to handle data in a specific media format, such as CAN.

The CPU 18 may run a software-based message handler 20. This can allow the CPU 18 to prepare common-format messages 14 which can then be sent either directly, or via the message router 8, to one or more message handlers $6_1$, $6_2$.

Message Handlers $6_1$, $6_2$

As mentioned earlier, a message handler $6_1$, $6_2$ receives data packages $13_1$, $13_2$ from a respective protocol engine $5_1$, $5_2$, such as a CAN protocol engine, and generates common-format packages 14.

Figure 4:
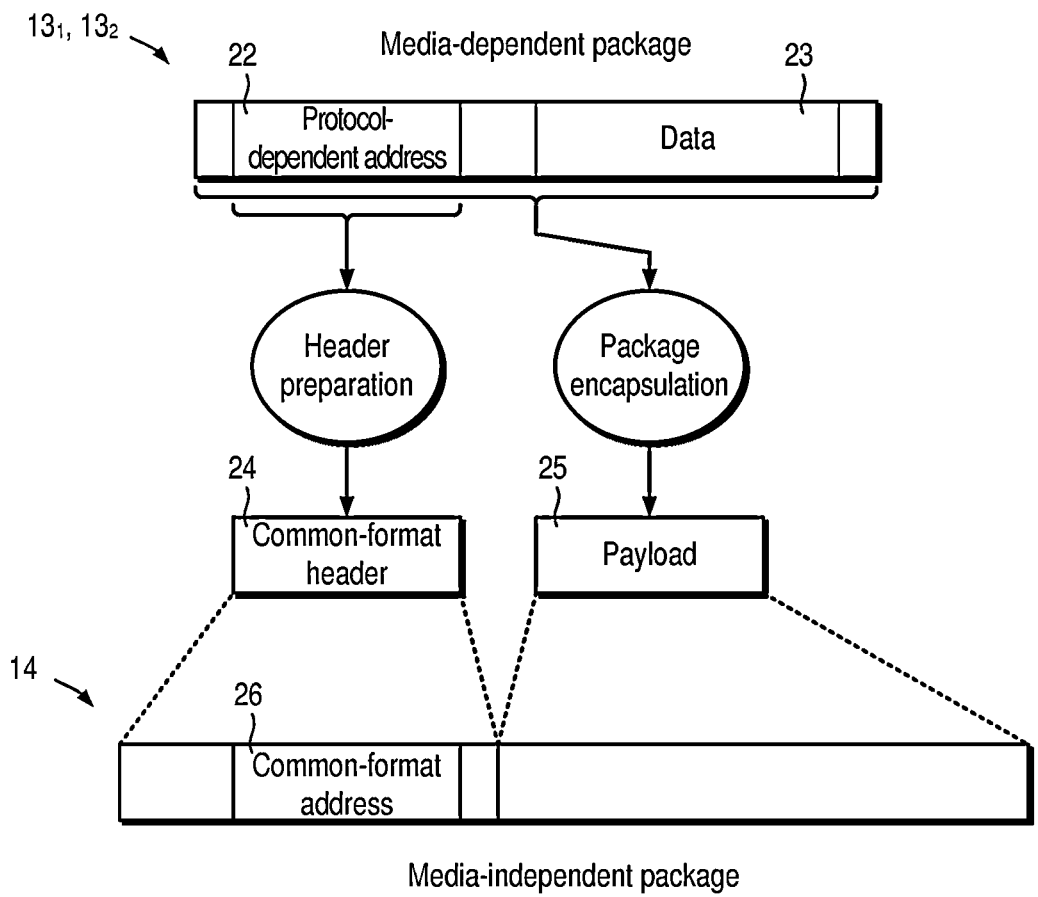
FIG. 4 illustrates conversion of a communications protocol-dependent package into a common-format package.

Referring also to FIG. 4, each data package $13_1$, $13_2$ includes a protocol-dependent address 22 and payload 23.

The format of the address 22 and how the address 22 is used depends on the communications protocols. For example, Ethernet uses 48-bit media access control (MAC) addresses to identify destination nodes for unicasting or multicasting packets. CAN uses 11- or 29-bit message identifiers to identify message content for multicasting messages. FlexRay uses a temporary relation to identify message content for multicasting messages.

Priority control can be included in the address, in the payload 23 or signalled in other ways. For example, in Ethernet, priority information is included in the payload, whereas in CAN, message priority is included in the message identity. In FlexRay, message priority is based on repetition in pre-defined cycles.

The message handler $6_1$, $6_2$ extracts the protocol-dependent address 22 from a data package $13_1$, $13_2$ and prepares a common-format header 24 and payload 25. The common-format header 24 includes a common-format address 26.

The message handler $6_1$, $6_2$ maps the protocol-dependent address 22 into a common-format address 26. Preferably, address and message identification are split into different fields. This can help to simplify routing of the common-format package 14.

The message handler $6_1$, $6_2$ encapsulates the data package $13_1$, $13_2$ received from the protocol engine $5_1$, $5_2$ into the payload 25 of the common-format message 14. Thus, the common-format message 14 can carry information for all supported data link layers, such as CAN message ID as well as a common-format address. If the common-format message 14 uses a layer-2 or layer-3 protocol which does not allow tunnelling of all fields (such as baud rate bit of CAN) such that it results in missing information, then the message handler $6_1$, $6_2$ may be configured to fill-in the missing information, for example, configured by software running on the CPU 18.

Figure 5:
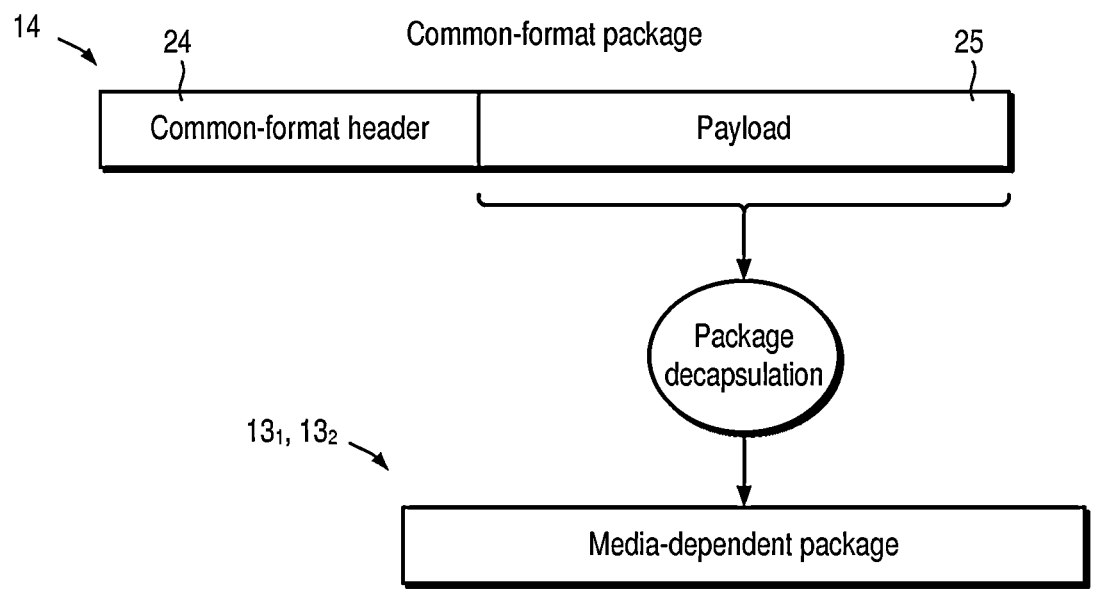
FIG. 5 illustrates conversion of a common-format package into a communications protocol-dependent package.

Referring also to FIG. 5, when a message handler $6_1$, $6_2$ receives a common-format package 14 from the message forwarder 10, it discards the header 26 and extracts the data package 13$_1$, 13$_2$ from the payload 25. The message handler 7$_1$, 7$_2$ then forwards the package 13$_1$, 13$_2$ to the protocol engine 5$_1$, 5$_2$.

As explained earlier, the message forwarder 8 may forward a common-format package 14 to more than one target. The one or more targets may include more than one message handler 6$_1$, 6$_2$. The one or more targets may include the CPU 18.

The common-format package 14 provides a common addressing format which allow identification of a target node (not shown) outside the control unit 16 (FIG. 3) or a target service (not shown) running on the CPU 18. The common addressing format preferably also provides a quality of service (QoS) level. The common addressing format provides a minimum set of information which allows switching or routing to be performed.

The common-format package 14 provides a container which allows a communication protocol, such as Ethernet, CAN or FlexRay, to map its message back into its protocol-specific message format.

The common-format package 14 can be any suitable type of layer-2 or layer-3 data container. Preferably, the common-format package 14 take the form of Audio Video Transport Protocol (AVTP) Control Format (ACF) messages defined according to IEEE 1722 using the 64-bit stream ID as the common-format address 26 and 8-level QoS according to IEEE 802.1Q for signalling priority levels. This allows a layer-2 Ethernet switch to be used a message forwarder 8.

ACF messages using stream ID as the common-format address need not be used. Other types of data container can be used, such as a layer-3 datagram (i.e. an "IP packet" or simply "packet") using the IP address as the common-format address (e.g. based on IPv4 or IPv6) or a layer-2 datagram (i.e. "frame") which uses the MAC address as the common-format address.

Figure 6:
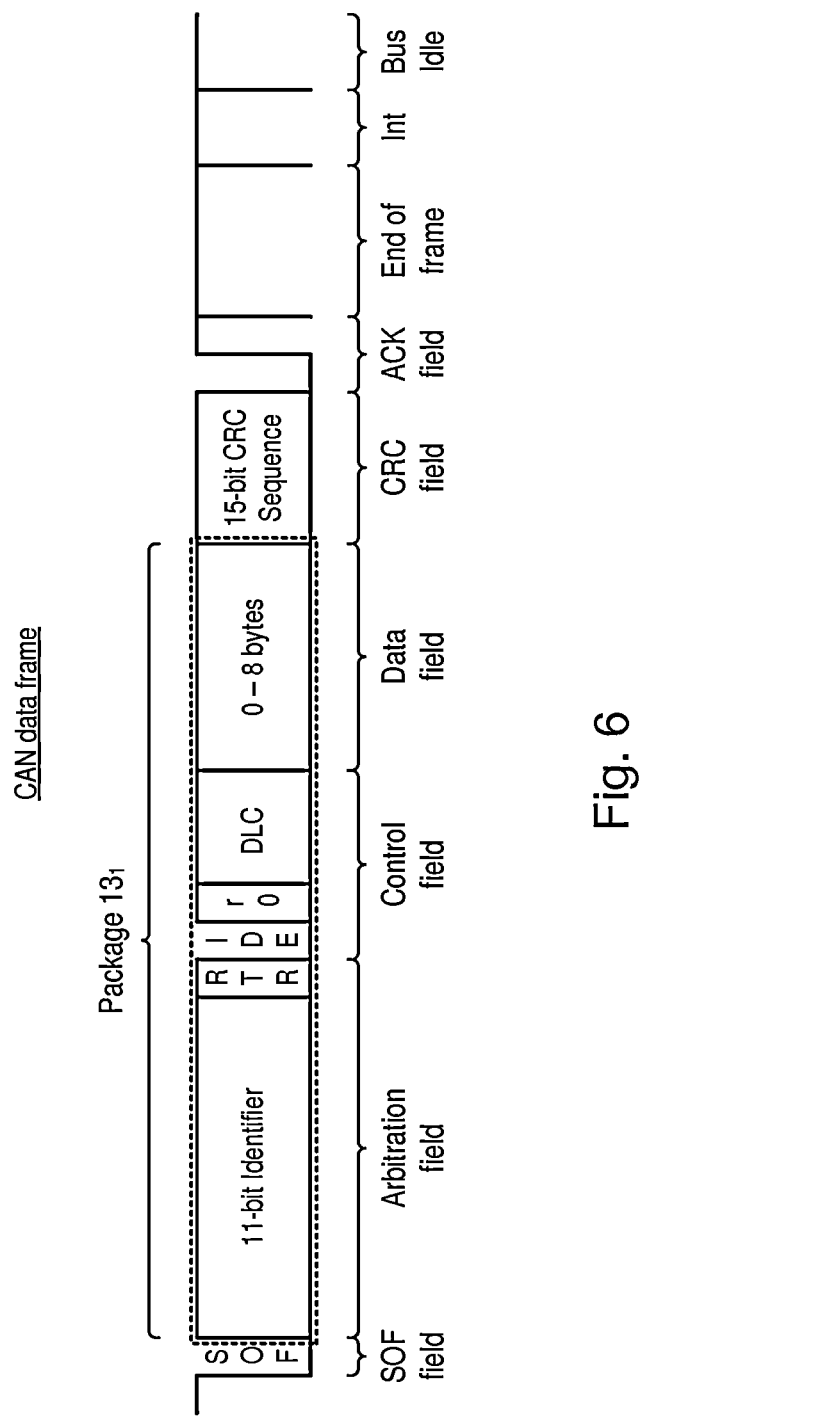
FIG. 6 illustrates a CAN frame including a CAN-dependent package.

FIG. 6 shows a data package 13$_1$, taken from a CAN data frame, which is passed from the protocol engine 5$_1$ to the message handler 6$_1$.

FIG. 7 shows how the data package 13$_1$ shown in FIG. 6 is converted into a common-format package 14.

As shown in FIG. 6, data in some of the fields, such as RTR, IDE and DATA (i.e. payload data), are obtained by copying data from the data package 13$_1$. Data are added to other fields according to pre-defined schemes which may be based on acceptance filter lists (AFLs) or look-up tables. Data are added to other fields dependent on data found in fields in the data package 13$_1$. Although the message handler 6$_1$ is implemented in hardware, it can be configured by the CPU 18.

The IEEE 802.1 and 802.1Q headers are not required, but are helpful because IEEE 1722 messages are typically encapsulated in Ethernet packages.

Referring to FIG. 8, a vehicular communications network 31 is shown. The network 31 includes a plurality of different busses 3$_1$, 3$_2$, 3$_3$, such as CAN and Ethernet. The network includes a plurality of control units 32 which may take the form of microcontrollers connected to the busses 3$_1$, 3$_2$, 3$_3$. At least some of the control units 3$_2$ are control units 16 which include network interface modules 7$_1$, 7$_2$ (FIG. 3) and message forwarder 8. The vehicular communications network 31 is deployed in a vehicle 33.

Referring to FIG. 9, an industrial communications network 41 is shown. The network 41 includes a plurality of different busses 3$_1$, 3$_2$, 3$_3$, such as CAN and Ethernet. The network includes a plurality of control units 42 which may take the form of microcontrollers connected to the busses 3$_1$, 3$_2$, 3$_3$. At least some of the control units 4$_2$ are control units 16 which include network interface modules 7$_1$, 7$_2$ (FIG. 3) and message forwarder 8. The industrial communications network 41 is deployed in a plant, machinery or system 43, such as a manufacturing or processing system.

The message handlers 6$_1$, 6$_2$ can have one or more benefits.

The message handlers 6$_1$, 6$_2$ can help to provide uniformity in the way messages are forwarded regardless of bus type and whether the message arrived on a communications bus or is generated by the CPU. It can also provide configurable flexibility, for example, allowing messages to be forwarded to multiple targets. Furthermore, the use of a common network stack reduces the degree of layer-3 software stack adaption when adding a new protocol. Moreover, a common set of functions are available, regardless of protocol, such as an abstract QoS mechanism (for example, mapped to IDs on CAN, to 802.1Q PCP on Ethernet and to scheduling on FlexRay), an abstract node addressing mechanism (for example mapped to IDs on CAN, to MAC, VLAN, AVTP or IPv4 on Ethernet) and a unified timestamping mechanism (for example, based on 802.1AS). Additionally, it can simplify software maintenance when changing protocol (for example, porting a CAN-based control unit to Ethernet).

Modifications

It will be appreciated that many modifications may be made to the embodiments hereinbefore described.

The control units may include more than two network interface modules. Two or more of the network interface modules may be of the same type, for example, CAN controllers. Thus, the control unit may be connected to more than two types of bus. The message forwarder may be connected to more than two network interface modules. Thus, the control unit may be connected to more than two busses of the same type. The message forwarder may be connected to more than two network interface modules. Thus, the message forwarder may switch or route common-format messages between three or more message handlers.

The invention claimed is:

1. A control unit comprising:
a first message handler configured to handle data packages formatted according to a first communications protocol;
a second message handler configured to handle data packages formatted according to a second communications protocol;
the control unit configured to exchange common-format packages having a common data format between the first and second message handlers;
the control unit further comprising:
a message forwarder, wherein the message forwarder is configured to exchange common-format packages having the common data format between the first and second message handlers;
a central processing unit sub-system, wherein the message forwarder is further configured to exchange common-format packages between the central processing unit sub-system, the first message handler and/or the second message handler;
wherein the central processing unit sub-system comprises a CPU configured to run a software-based message interface configured;

in a first case, to prepare common-format packages and to send them to one or both of the first message handler and the second message handler, in a second case, to prepare common-format packages and to send them to one or both of the first message handler and the second message handler via the message forwarder; and in a third case, to prepare common-format packages, to send them directly to one of the first message handler and the second message handler, and to send them via the message forwarder to the other of the first message handler and the second message handler.

2. The control unit of claim 1, wherein the second communications protocol is different to the first communications protocol.

3. The control unit of claim 1, wherein the message forwarder is configured, in response to receiving a given common format package:

in a case that the given common format package corresponds to one of one or more predetermined types, to route the given common format package automatically;

in a case that the given common format package does not correspond to one of one or more predetermined types and the control unit is set to a first mode, to route the given common format package to the CPU;

in a case that the given common format package does not correspond to one of one or more predetermined types and the control unit is set to a first mode, to drop the given common format package.

4. The control unit of claim 3, further comprising:

a first network interface module configured to handle first data packages formatted according to the first communications protocol and comprising the first message handler and a first protocol engine, wherein the first message handler is configured to exchange first data packages formatted according to the first communications protocol with the first protocol engine; and a second network interface module configured to handle second data packages formatted according to the second communications protocol and comprising the second message handler and a second protocol engine, wherein the second message handler is configured to exchange second data packages formatted according to the second communications protocol with the second protocol engine.

5. The control unit of claim 4, wherein the wherein the first network interface module is hardware-implemented and the second network interface module is hardware-implemented.

6. The control unit of claim 5, wherein:

the first message handler is configured, in response to receiving a first data package which is formatted according to the first communications protocol and which comprises first package-directing data and first payload data, to generate a common-format package having the common data format which comprises a header and common format payload data, wherein the header comprises an address generated in dependence upon the first package-directing data and wherein the common format payload data comprises the first data package; and the second message handler is configured, in response to receiving a second data package which is formatted according to the second communications protocol and which comprises second package-directing data and second payload data, to generate a common-format package having the common data format, wherein the header comprises an address generated in dependence upon the second package-directing data and wherein the common format payload data comprises the second data package.

7. The control unit of claim 6, wherein:

the first message handler is further configured to copy data from a first field in the first package-directing data into a corresponding field in the header; and the second message handler is further configured to copy data from a first field in the second package-directing data into a corresponding field in the header.

8. The control unit of claim 3, wherein the common format package having the common data format is a layer-2 or layer-3 package.

9. The control unit of claim 6, wherein:

the first message handler is configured to add predetermined data to a second field in the header; and the second message handler is configured to add predetermined data to a second field in the header.

10. The control unit of claim 7, wherein:

the first message handler is configured to add calculated data to the header in dependence upon data from the first field and/or from a second field in the first package-directing data to a second field in the header; and the second message handler is configured to add calculated data to the header in dependence upon data from the first field and/or from a second field in the second package-directing data to a second field in the header.

11. The control unit of claim 6, wherein:

the first message handler is configured, in response to receiving a common-format package having the common data format, to extract a first data package which is formatted according to a given communications protocol and which comprises first package-directing data and first payload data; and the second message handler is configured, in response to receiving a common-format package having the common data format, to extract a second data package which is formatted according to a given communications protocol and which comprises second package-directing data and second payload data.

12. The control unit of claim 1, wherein the first and/or second communications protocol is one of ISO 11898-1, the controller area network flexible data rate protocol, an Ethernet based protocol, EtherCAT, CC-Link IE Field, PROFINET, EtherNet/IP, Modbus TCP or FL-net.

13. The control unit of claim 1, wherein the message forwarder is a layer-2 switch and/or a layer 3-router.

14. The control unit of claim 4, further comprising a first network interface module configured to handle third data packages formatted according to the first communications protocol and comprising a third message handler and a third protocol engine, wherein the third message handler is configured to exchange third data packages formatted according to the third communications protocol with the third protocol engine;

wherein the control unit is configured to exchange packages having a common data format between the first, second and third message handlers.

15. A communications system comprising:

at least two sets of bus lines including a first bus line and a second bus line; and at least one control unit according to claim 1, wherein the first message handler is coupled to the first bus line and the second message handler is coupled to the second bus line.

16. A vehicle comprising the communications system of claim 15.

17. An industrial system comprising the communications system of claim 15.

* * * * *

UNITED STATES PATENT AND TRADEMARK OFFICE
CERTIFICATE OF CORRECTION

PATENT NO. : 12,212,639 B2
APPLICATION NO. : 18/384574
DATED : January 28, 2025
INVENTOR(S) : Christian Mardmoeller et al.

Page 1 of 1

It is certified that error appears in the above-identified patent and that said Letters Patent is hereby corrected as shown below:

In the Specification

Column 1, Line 12, "35 U.S.C. 119 (e);" should read as -- 35 U.S.C. 119(e) --

In the Claims

In Column 9, Claim 1, Line 2, "send them to one" should read as -- send them directly to one --

In Column 9, Claim 5, Line 46, "wherein the wherein the" should read as -- wherein the --

In Column 10, Claim 13, Line 49, "a layer 3-router." should read as -- a layer-3 router. --

Signed and Sealed this
Twentieth Day of May, 2025

Coke Morgan Stewart
*Acting Director of the United States Patent and Trademark Office*